United States Patent
Chou (10) Patent No.: US 8,297,321 B2
(45) Date of Patent: Oct. 30, 2012

(54) DEVICE FOR SEALING AND INFLATING INFLATABLE OBJECT

(76) Inventor: Wen San Chou, Tainan Hsien (TW)

( * ) Notice: Subject to any disclaimer, the term of this patent is extended or adjusted under 35 U.S.C. 154(b) by 299 days.

(21) Appl. No.: 12/803,720

(22) Filed: Jul. 2, 2010

(65) Prior Publication Data

US 2012/0000572 A1    Jan. 5, 2012

(51) Int. Cl.
    *B65B 31/00* (2006.01)
(52) U.S. Cl. ............................. 141/38; 141/67
(58) Field of Classification Search ............ 141/38, 141/67, 114, 231, 313; 81/15.6
    See application file for complete search history.

(56) References Cited

U.S. PATENT DOCUMENTS

| | | | |
|---|---|---|---|
| 6,176,285 B1 | 1/2001 | Gerresheim et al. | |
| 6,283,172 B1 | 9/2001 | Thurner | |
| 6,345,650 B1 | 2/2002 | Paasch et al. | |
| 6,454,892 B1 | 9/2002 | Gerresheim et al. | |
| 6,889,723 B2 * | 5/2005 | Gerresheim et al. | 141/38 |
| 7,021,348 B2 | 4/2006 | Eriksen et al. | |
| 7,178,564 B2 | 2/2007 | Kojima et al. | |
| 2008/0196789 A1* | 8/2008 | Hartl | 141/38 |

* cited by examiner

*Primary Examiner* — Gregory Huson
*Assistant Examiner* — Jason K Niesz
(74) *Attorney, Agent, or Firm* — Charles E. Baxley (57) ABSTRACT

A sealing and inflating assembly includes an air compressor for generating a pressurized air, a tire repairing container for receiving a sealing preparation having a mouth opening, an outlet piece attached to the mouth opening of the container and having an entrance for coupling to the air compressor and having an inlet conduit for guiding the pressurized air to flow into the container, and having an inlet conduit for allowing the sealing preparation to flow out of the outlet piece, a pipe having one end coupled to the inlet conduit of the outlet piece, and a check valve device attached to the pipe for controlling the pressurized air to flow into the container, and for preventing the sealing preparation from flowing into the pipe.

12 Claims, 8 Drawing Sheets

DEVICE FOR SEALING AND INFLATING INFLATABLE OBJECT

BACKGROUND OF THE INVENTION

1. Field of the Invention

The present invention relates to an air compressor or a sealing and inflating assembly for sealing and inflating an inflatable object, and more particularly to an air compressing device including an improved tire repairing container for quickly coupling and attaching and securing to an outlet tube of the air compressor and for quickly disengaging from the air compressor and for allowing the tire sealing preparation to be effectively supplied to seal and inflate the inflatable objects.

2. Description of the Prior Art

Various kinds of typical air compressing devices have been developed by the applicant and comprise a cylinder housing, a piston slidably received in the cylinder housing, and a motor coupled or attached to the cylinder housing and coupled to the piston for moving the piston relative to the cylinder housing in a reciprocating action, in order to generate a pressurized air of a greater air pressure and a decreased flowing quantity, and a pressure tight container for receiving a sealing preparation and for selectively supplying the sealing preparation to seal and inflate the inflatable objects, such as vehicle tires, air beds, air cushions, hovercrafts, etc.

For example, U.S. Pat. No. 6,176,285 to Gerresheim et al., U.S. Pat. No. 6,283,172 to Thurner, and U.S. Pat. No. 6,345,650 to Paasch et al. disclose several of the typical preparations for the sealing of tires with punctures, and repairing apparatuses for the sealing and pumping up of tires and tires with an integrated sealing preparation comprising a pressure tight container that is coupled to a pressurized air cartridge.

However, the pressure tight container and the pressurized air cartridge are coupled together with a shut off valve, a gas outlet, a gas inlet and may not be easily disengaged from each other, and an outlet valve and an additional riser tube are further required to be attached to the upper portion of the pressure tight container for allowing the sealing preparation to be selectively supplied to seal and inflate the inflatable objects, but may not be easily connected or coupled to the air compressor devices.

U.S. Pat. No. 6,454,892 to Gerresheim et al. and U.S. Pat. No. 6,889,723 to Gerresheim et al. disclose two of the typical preparations for sealing punctured tires and apparatuses for the sealing and pumping up of tires, and each comprising a pressure tight container coupled to an air compressor, and a shut off valve and a gas inlet are coupled to the air compressor and the pressure tight container for supplying the pressurized air to force the sealing preparation to seal the inflatable objects.

However, the pressure tight container may not be easily removed from the air compressor, and the air compressor also may not be easily and quickly and directly coupled to the inflatable objects and to readily inflate the inflatable objects, such as tires, air beds, air cushions, hovercrafts, etc., in addition, the puncture sealant is required to flow through the shut off valve and the outlet valve.

U.S. Pat. No. 7,021,348 to Eriksen et al. discloses a further typical device for sealing and inflating an inflatable object and comprising a tubular container coupled to an air compressor, and a complicated coupling structure is further required for coupling the tubular container to the air compressor.

However, similarly, the tubular container may not be easily and quickly removed from the air compressor, and the air compressor may not be easily and quickly and directly coupled to the inflatable objects and to inflate the inflatable objects, in addition, the puncture sealant is required to flow through the complicated coupling structure.

U.S. Pat. No. 7,178,564 to Kojima et al. discloses a still further typical supplying/removing device of puncture sealant of tire and comprising a pressure resistant bottle coupled to an air compressor or a high pressure source, and a complicated coupling apparatus body is further required for coupling the pressure resistant bottle to the air compressor.

However, similarly, the pressure resistant bottle may not be easily removed from the air compressor, and the air compressor may not be easily and quickly and directly coupled to the inflatable objects and to inflate the inflatable objects, in addition, the puncture sealant is required to flow through the complicated coupling apparatus body.

The present invention has arisen to mitigate and/or obviate the afore-described disadvantages of the conventional air compressor devices and/or sealing and inflating devices for sealing and inflating the inflatable objects.

SUMMARY OF THE INVENTION

The primary objective of the present invention is to provide a sealing and inflating assembly comprising an air compressing device including an improved tire repairing container for quickly coupling and attaching and securing to an outlet tube of the air compressor and for quickly disengaging from the air compressor and for allowing the tire sealing preparation to be effectively supplied to seal and inflate the inflatable objects.

The other objective of the present invention is to provide a sealing and inflating assembly for sealing and inflating an inflatable object comprising a tire repairing container that may be easily and quickly and changeably attached and secured to the outlet tube of the air compressor.

In accordance with one aspect of the invention, there is provided a sealing and inflating assembly comprising an air compressor including a cylinder housing and a motor coupled to the cylinder housing for generating a pressurized air, the cylinder housing including an outlet tube extended outwardly therefrom and communicating with the cylinder housing for receiving the pressurized air from the cylinder housing, and including an outlet port provided on the outlet tube, a tire repairing container including a compartment formed therein for receiving a sealing preparation, and including a mouth opening formed therein, an outlet piece attached and secured to the mouth opening of the tire repairing container, and including an entrance for coupling to the outlet port of the outlet tube, and including an inlet conduit formed therein and communicative with the entrance thereof for guiding the pressurized air to flow through the outlet piece and then into the compartment of the tire repairing container, and including an outlet conduit formed therein and communicative with the compartment of the tire repairing container and offset from the entrance of the outlet piece for allowing the sealing preparation in the compartment of the tire repairing container to selectively flow out through the outlet conduit of the outlet piece, a pipe disposed in the compartment of the tire repairing container, and including a first end coupled to the inlet conduit of the outlet piece, and including a bore formed therein and communicative with the inlet conduit of the outlet piece for directing and guiding the pressurized air to flow through the bore of the pipe and to flow into the compartment of the tire repairing container, and including a second end having an air perforation formed therein and communicative with the bore of the pipe, and a first check valve device attached onto the second end of the pipe for controlling the pressurized air to selectively flow into the compartment of the tire repairing container, and for preventing the sealing preparation from flowing into the bore of the pipe.

The first check valve device includes a resilient sleeve attached onto the second end of the pipe for selectively blocking the air perforation of the pipe. The pipe includes a peripheral recess formed in the second end of the pipe and communicative with the air perforation of the pipe. The pipe includes at least one peripheral bulge extended radially and outwardly therefrom for engaging with the sleeve.

The pipe includes a peripheral groove formed in the second end of the pipe, and the sleeve includes a peripheral swelling extended radially and inwardly for selectively engaging with the peripheral groove of the pipe and for anchoring and retaining the sleeve to the second end of the pipe.

The outlet piece includes a second check valve device disposed between the pipe and the outlet conduit of the outlet piece for controlling the sealing preparation to selectively flow out through the outlet conduit of the outlet piece.

The outlet piece includes a peripheral fence extended therefrom for forming a peripheral chamber between the peripheral fence and the pipe, and the second check valve device includes a stop member slidably received and engaged in the peripheral chamber of the outlet piece for selectively blocking and enclosing the peripheral chamber of the outlet piece and for preventing the sealing preparation from flowing out through the outlet conduit of the outlet piece.

The second check valve device includes a spring-biasing member received and engaged in the peripheral chamber of the outlet piece and engaged with the stop member for biasing the stop member to selectively block and enclose the peripheral chamber of the outlet piece.

The pipe includes a peripheral shoulder formed therein for selectively engaging with the stop member. The outlet piece includes a cover attached to the peripheral fence for selectively blocking and enclosing the peripheral chamber of the outlet piece.

The outlet piece includes at least one peg extended from the peripheral fence, and the cover includes at least one orifice formed therein for engaging with the peg of the peripheral fence and for anchoring and positioning the cover to the peripheral fence of the outlet piece. The cover includes a number of apertures formed therein for communicating the compartment of the tire repairing container with the peripheral chamber of the outlet piece.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
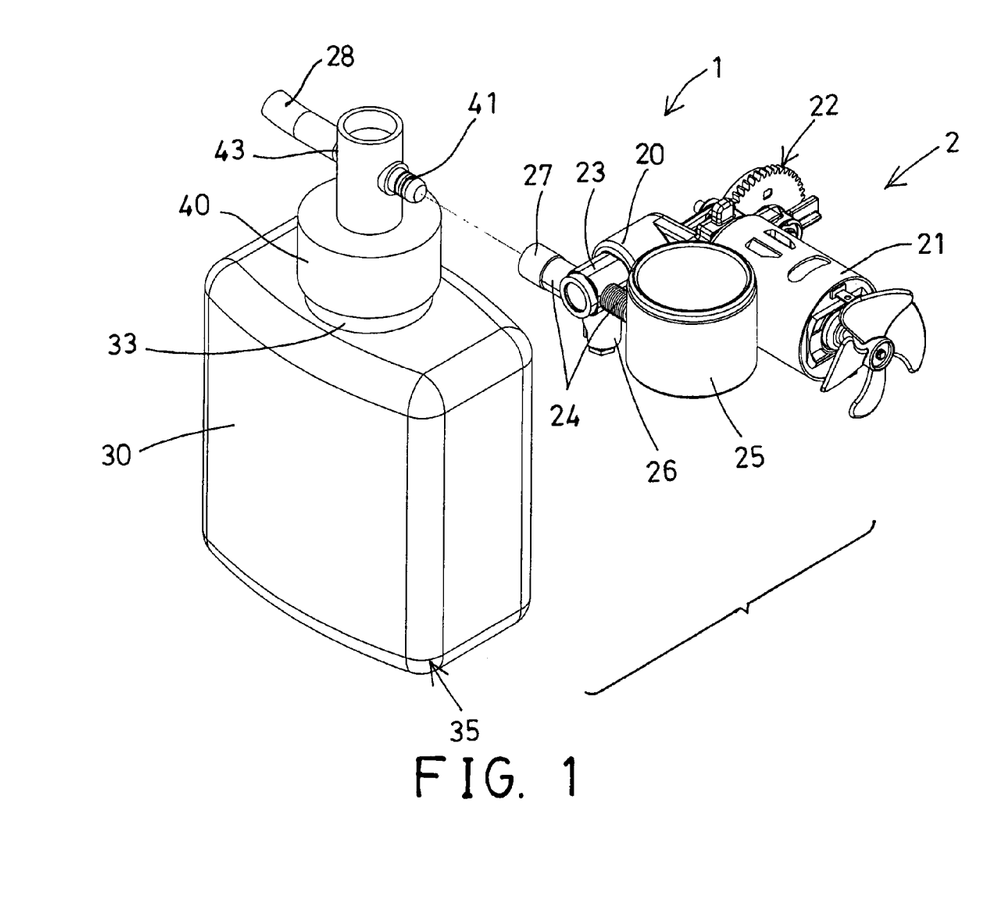
FIG. 1 is a partial exploded view of a sealing and inflating assembly in accordance with the present invention.
Figure 2:
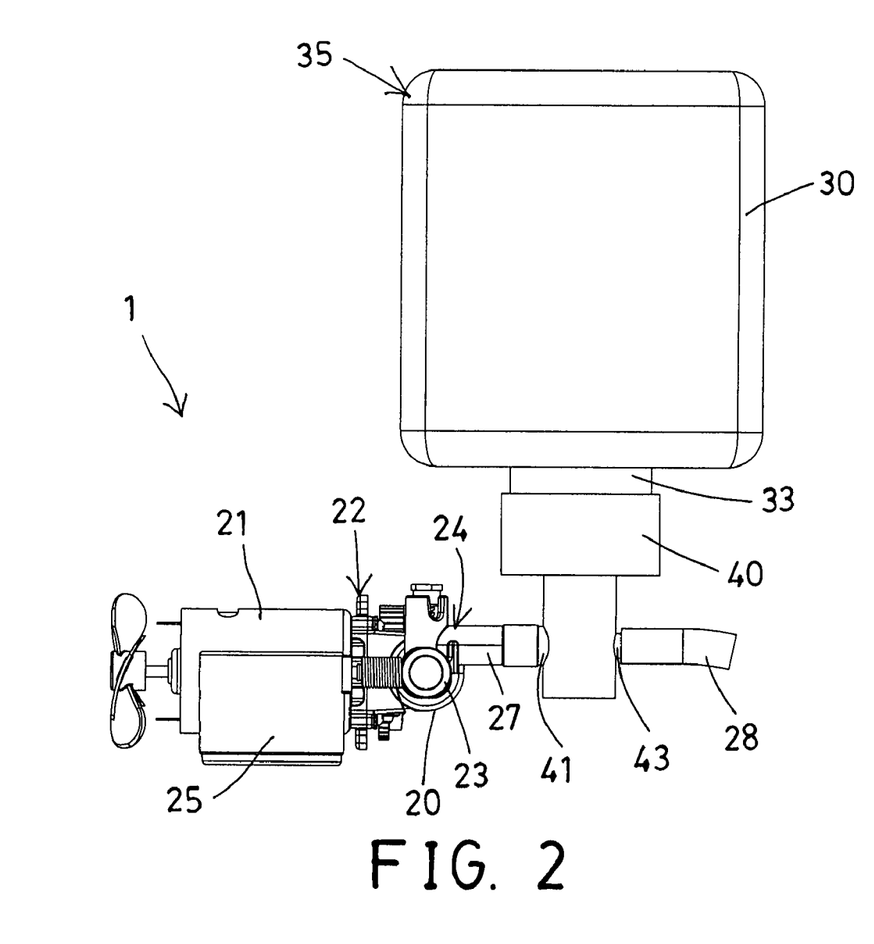
FIG. 2 is a partial plan schematic view of the sealing and inflating assembly.
Figure 3:
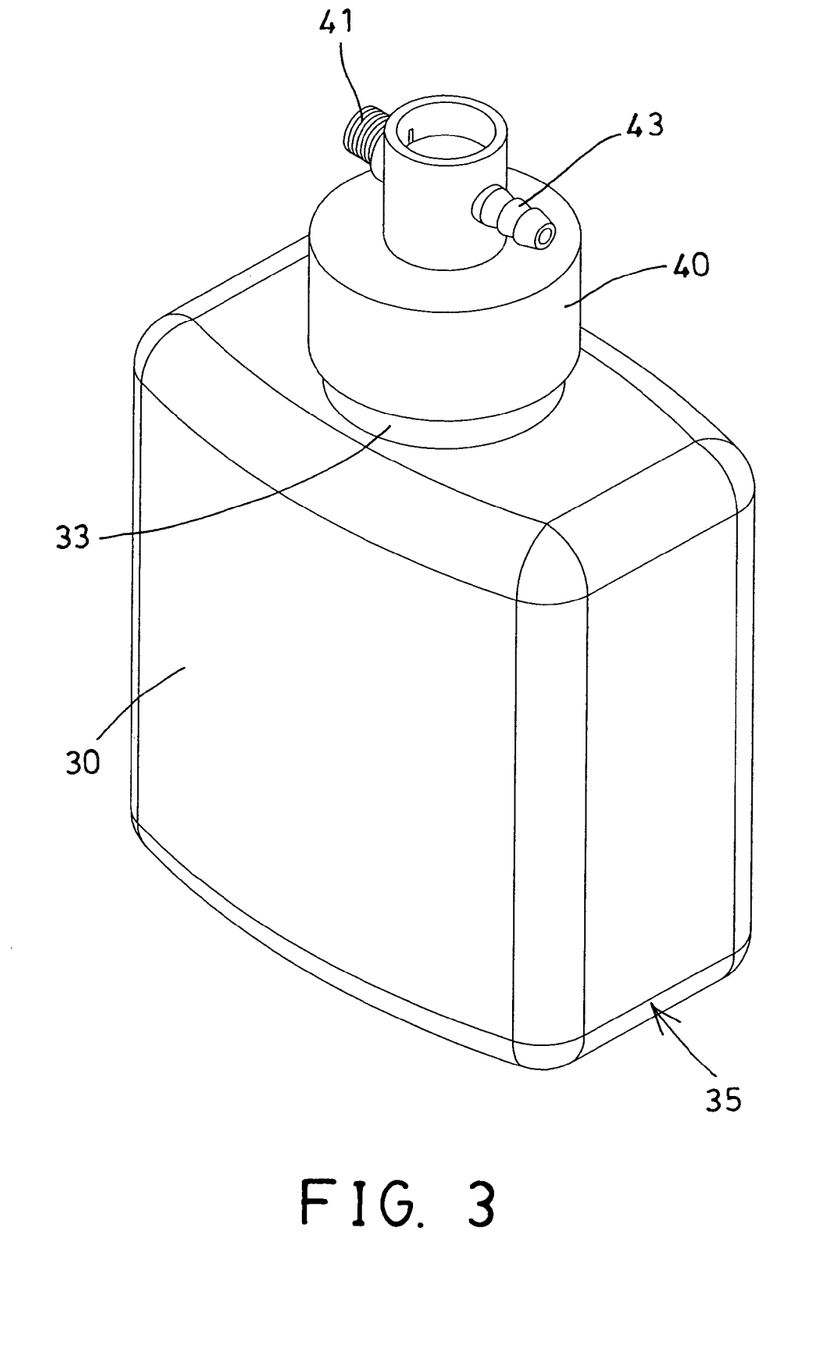
FIG. 3 is a perspective view of the tire repairing container of the sealing and inflating assembly.
Figure 4:
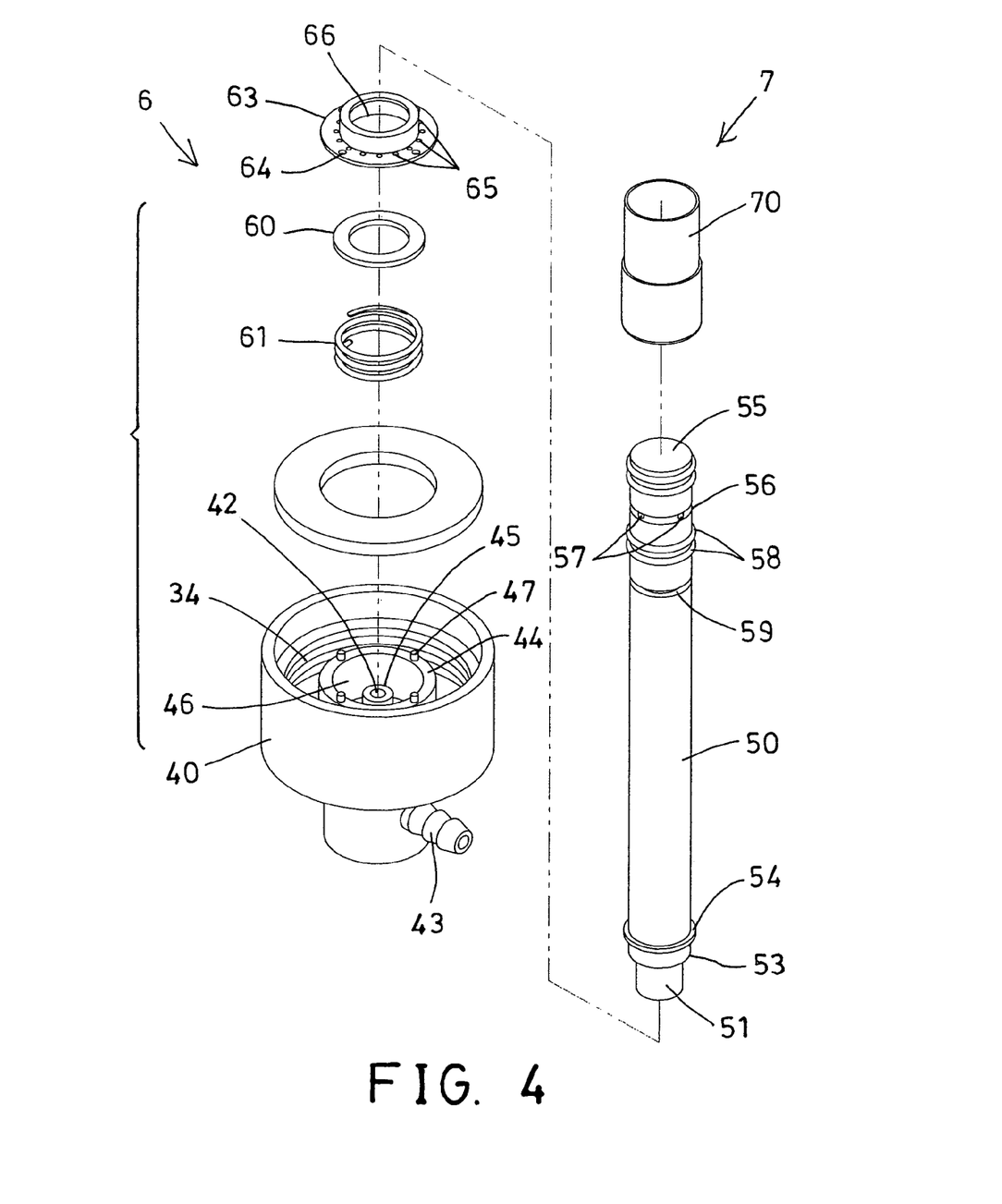
FIG. 4 is another partial exploded view of the tire repairing container of the sealing and inflating assembly.
Figure 5:
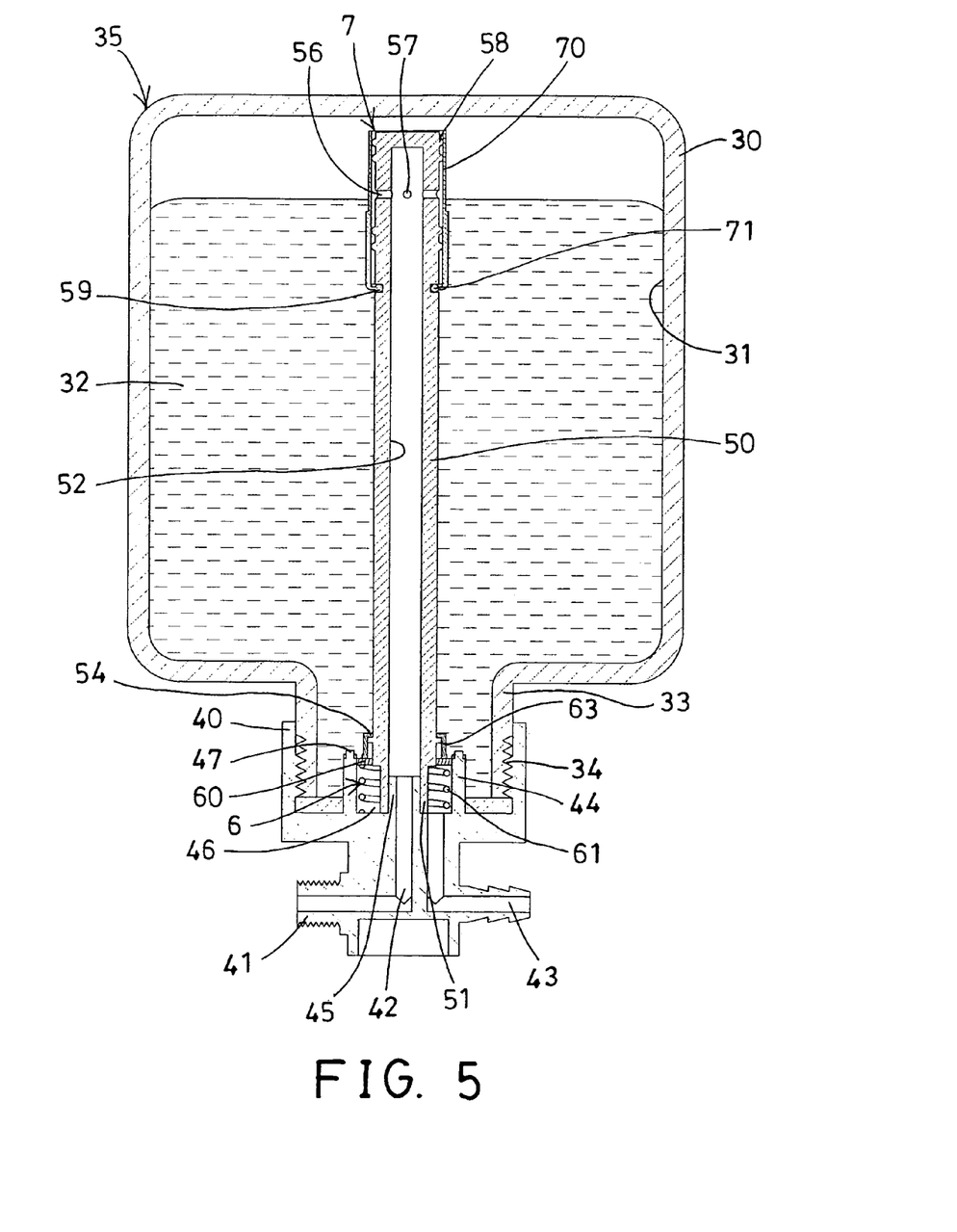
FIG. 5 is a partial cross sectional view illustrating a tire repairing container of the sealing and inflating assembly.

Referring to the drawings, and initially to FIGS. 1-2, a sealing and inflating assembly 1 in accordance with the present invention comprises an air compressing device 2 including a cylinder housing 20 for slidably receiving and attaching and securing a piston therein (not shown), a motor 21 attached and secured to the cylinder housing 20 and coupled to the piston and/or a piston rod (not shown) with an eccentric or gear coupling device 22 for moving the piston relative to the cylinder housing 20 in a reciprocating action, in order to generate a pressurized air of a relatively greater air pressure and a decreased flowing quantity. The above-described structure is typical and will not be described in further details.

Several examples of the typical air compressing devices or sealing and inflating devices are disclosed in the prior U.S. patents which may be taken as the references for the present invention. For example, the cylinder housing 20 normally includes an outlet tube 23 extended outwardly therefrom and communicating with the cylinder housing 20 for receiving the pressurized air from the cylinder housing 20, and includes one or more (such as four) outlet ports 24 formed or provided or extended from the outlet tube 23 for coupling to various parts or elements or facilities, such as pressure gauges 25, nozzles or safety or relief valves 26, hoses 27 or the like, in which the hose 27 may be provided for coupling to various air facilities or inflatable objects (not shown), such as tires, air beds, air cushions, hovercrafts, etc.

In the present invention, the hose 27 is provided for coupling to a tire repairing container 30 before coupling to the air facilities or inflatable objects (not shown), such as tires, air beds, air cushions, hovercrafts, etc. As shown in FIGS. 3-8, the tire repairing container 30 includes a compartment 31 formed therein for receiving a sealing preparation 32 and for selectively supplying the sealing preparation 32 to seal and inflate the inflatable objects, such as vehicle tires, air beds, air cushions, hovercrafts, etc., and includes a mouth opening 33 formed or provided on the upper or lower portion of the tire repairing container 30 for filling or discharging the sealing preparation 32 into or from the compartment 31 of the tire repairing container 30.

The tire repairing container 30 further includes an outlet mouth or piece 40 attached and secured to the mouth opening 33 of the tire repairing container 30 with latches or fasteners (not shown), adhesive materials or threading engagements 34, for blocking or enclosing the mouth opening 33 of the tire repairing container 30, the outlet piece 40 includes an entrance 41 for attaching or securing or coupling to one of the outlet ports 24 of the outlet tube 23 with the hose 27 for allowing the pressurized air from the cylinder housing 20 to be suitably supplied to the outlet piece 40 and then into the compartment 31 of the tire repairing container 30, and includes an inlet conduit 42 formed therein and communicative with the entrance 41 thereof for suitably guiding the pressurized air to flow through the outlet piece 40 and then into the compartment 31 of the tire repairing container 30.

The outlet piece 40 further includes an outlet conduit 43 formed therein and communicative with the compartment 31 of the tire repairing container 30, but offset from the entrance 41 thereof for allowing the sealing preparation 32 in the compartment 31 of the tire repairing container 30 to selectively flow out through the outlet conduit 43 of the outlet piece 40, for example, the outlet conduit 43 of the outlet piece 40 may be coupled to the air facilities or inflatable objects (not shown), such as tires, air beds, air cushions, hovercrafts, etc. with another hose 28, and thus for allowing the pressurized air to be suitably supplied into the compartment 31 of the tire repairing container 30, and then to force the sealing preparation 32 in the compartment 31 of the tire repairing container 30 to flow to and to inflate the inflatable objects or vehicle tires or the like.

As shown in FIGS. 5-8, the outlet piece 40 includes a peripheral or cylindrical fence 44 extended therefrom, and includes a protruded stud 45 extended therefrom and located within the peripheral fence 44 for forming or defining a peripheral chamber 46 between the peripheral fence 44 and the stud 45 or a pipe 50, in which the inlet conduit 42 is formed through the stud 45 and offset from the peripheral chamber 46 of the outlet piece 40 for suitably guiding the pressurized air to flow through the inlet conduit 42 of the outlet piece 40 and then into the compartment 31 of the tire repairing container 30, and the peripheral chamber 46 of the outlet piece 40 is communicative with the outlet conduit 43 of the outlet piece 40 for suitably guiding the sealing preparation 32 in the compartment 31 of the tire repairing container 30 to selectively flow out through the outlet conduit 43 of the outlet piece 40.

Figure 6:
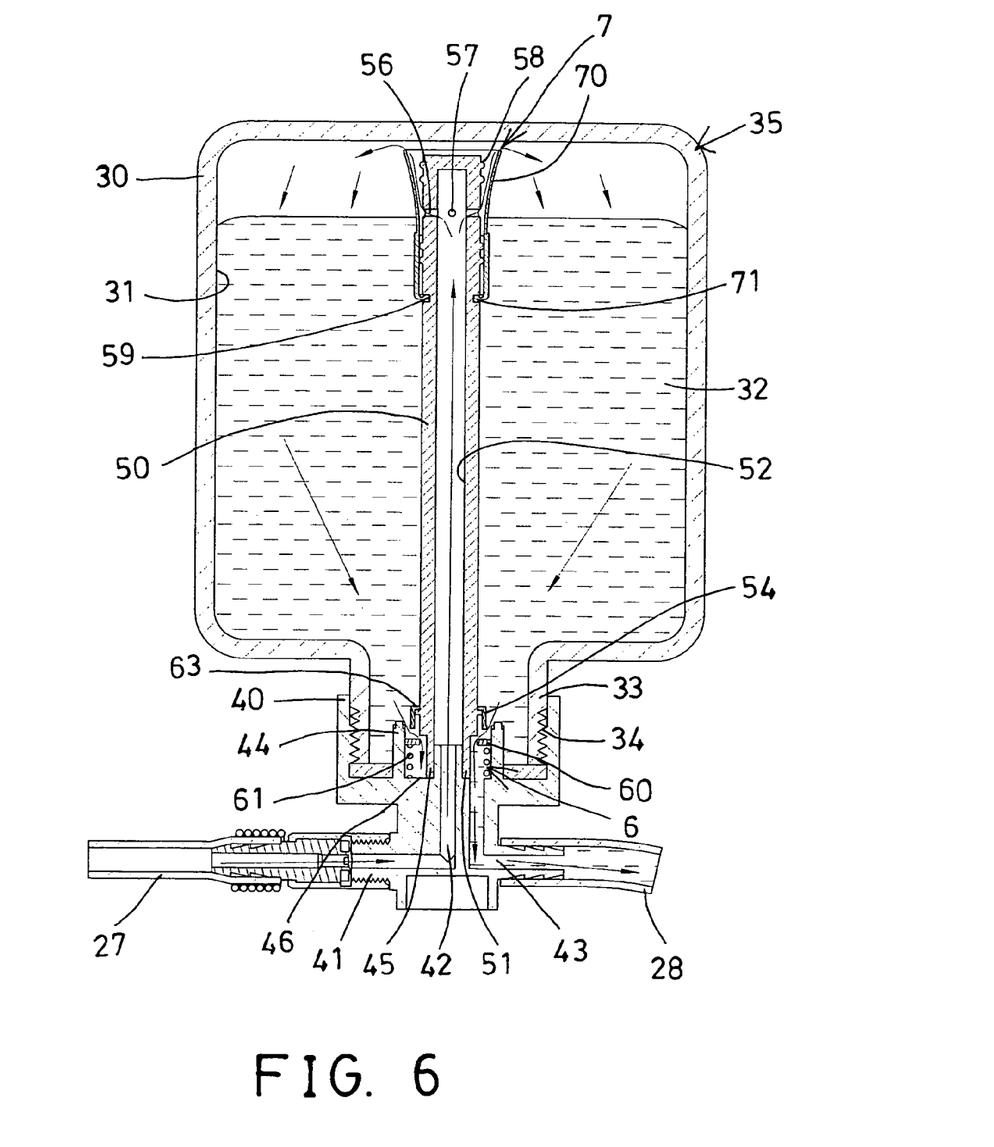
FIG. 6 is a partial cross sectional view similar to FIG. 5, illustrating the operation of the sealing and inflating assembly.

A pipe 50 is disposed in the compartment 31 of the tire repairing container 30, and includes one or first end or lower portion 51 attached or mounted or secured or coupled to the inlet conduit 42 of the outlet piece 40, such as coupled to the stud 45, and includes a bore 52 formed therein and communicative with the inlet conduit 42 of the outlet piece 40 for directing or guiding the pressurized air to flow through the bore 52 of the pipe 50 and then to flow into the lower or the upper or the base portion 35 of the compartment 31 of the tire repairing container 30, best shown in FIG. 6. It is preferable that the pipe 50 includes a narrowed one end or lower portion 51 thereof for forming a peripheral shoulder 53 in the one end or lower portion 51 of the pipe 50.

A check valve device 6 includes a ring-shaped stop member 60 slidably received or engaged in the peripheral chamber 46 of the outlet piece 40 and contactable or engageable with the peripheral shoulder 53 of the pipe 50 for selectively blocking or enclosing the peripheral chamber 46 of the outlet piece 40 (FIGS. 5, 7) and for preventing the sealing preparation 32 from flowing out through the outlet conduit 43 of the outlet piece 40. A spring-biasing member 61 is also received or engaged in the peripheral chamber 46 of the outlet piece 40 and engaged with the stop member 60 for biasing or forcing the stop member 60 to selectively engage with the peripheral shoulder 53 of the pipe 50 and to selectively block or enclose the peripheral chamber 46 of the outlet piece 40. The pressurized air supplied into the compartment 31 of the tire repairing container 30 may force the sealing preparation 32 to move the stop member 60 and to selectively open the peripheral chamber 46 of the outlet piece 40 (FIGS. 6, 8), and thus to allow the sealing preparation 32 to selectively flow out through the outlet conduit 43 of the outlet piece 40.

A cover 63 may further be provided and attached or mounted or secured to the peripheral fence 44 for selectively blocking or enclosing the peripheral chamber 46 of the outlet piece 40. For example, the outlet piece 40 includes one or more (such as four) projections or pegs 47 extended from the peripheral fence 44, and the cover 63 includes one or more (such as four) orifices 64 formed therein (FIG. 4) for receiving or engaging with the pegs 47 of the peripheral fence 44 and for anchoring or positioning or retaining the cover 63 to the peripheral fence 44 of the outlet piece 40. The cover 63 further includes a number of apertures 65 formed therein for communicating the compartment 31 of the tire repairing container 30 with the peripheral chamber 46 of the outlet piece 40.

The cover 63 may selectively block or enclose the peripheral chamber 46 of the outlet piece 40 when the stop member 60 is engaged with the peripheral shoulder 53 of the pipe 50, or when the stop member 60 is engaged with the cover 63. The cover 63 further includes a bore 66 formed therein for snugly receiving or engaging with the pipe 50. The pipe 50 may further include a peripheral rib 54 extended radially and outwardly therefrom for selectively engaging with the cover 63 and for anchoring or positioning or retaining the cover 63 between the pipe 50 and the peripheral fence 44 of the outlet piece 40, and thus for forming the check valve device 6 between the pipe 50 and the peripheral fence 44 of the outlet piece 40 or in the peripheral chamber 46 of the outlet piece 40.

The pipe 50 includes the other or second end or upper portion 55 having an enclosed or blind structure, and includes a peripheral recess 56 formed in the upper portion or other or second end 55 thereof, and includes one or more air perforations 57 formed therein and communicative with the peripheral recess 56 thereof and also communicative with the bore 52 of the pipe 50 for allowing the pressurized air to flow from the bore 52 of the pipe 50 and then to flow into the lower or the upper or the base portion 35 of the tire repairing container 30. The pipe 50 may further include one or more peripheral bulges 58 extended radially and outwardly therefrom, and located beside or above or below the peripheral recess 56 of the pipe 50, and may further include a peripheral groove 59 formed in the upper portion or other or second end 55 thereof and offset from the peripheral recess 56 and the peripheral bulges 58 of the pipe 50.

A check valve device 7 includes a soft or resilient or spring barrel or cylindrical member or sleeve 70 resiliently attached or mounted or secured or engaged onto the upper portion or other or second end 55 of the pipe 50 and engaged with the peripheral bulges 58 for selectively blocking or enclosing the air perforations 57 of the pipe 50, and includes a peripheral swelling 71 extended radially and inwardly from the sleeve 70 for selectively engaging with the peripheral groove 59 of the pipe 50 and for anchoring or positioning or retaining the sleeve 70 to the upper portion or other or second end 55 of the pipe 50, and the sleeve 70 includes a suitable resilience for allowing the pressurized air to selectively force or expand the sleeve 70 radially and outwardly (FIG. 6) and thus to allow the pressurized air to selectively flow into the lower or the upper or the base portion 35 of the tire repairing container 30, and the sleeve 70 may thus be formed as the check valve device 7 for allowing only the pressurized air to flow into the base portion 35 of the tire repairing container 30, and for preventing the sealing preparation 32 from flowing into the pipe 50.

Figure 7:
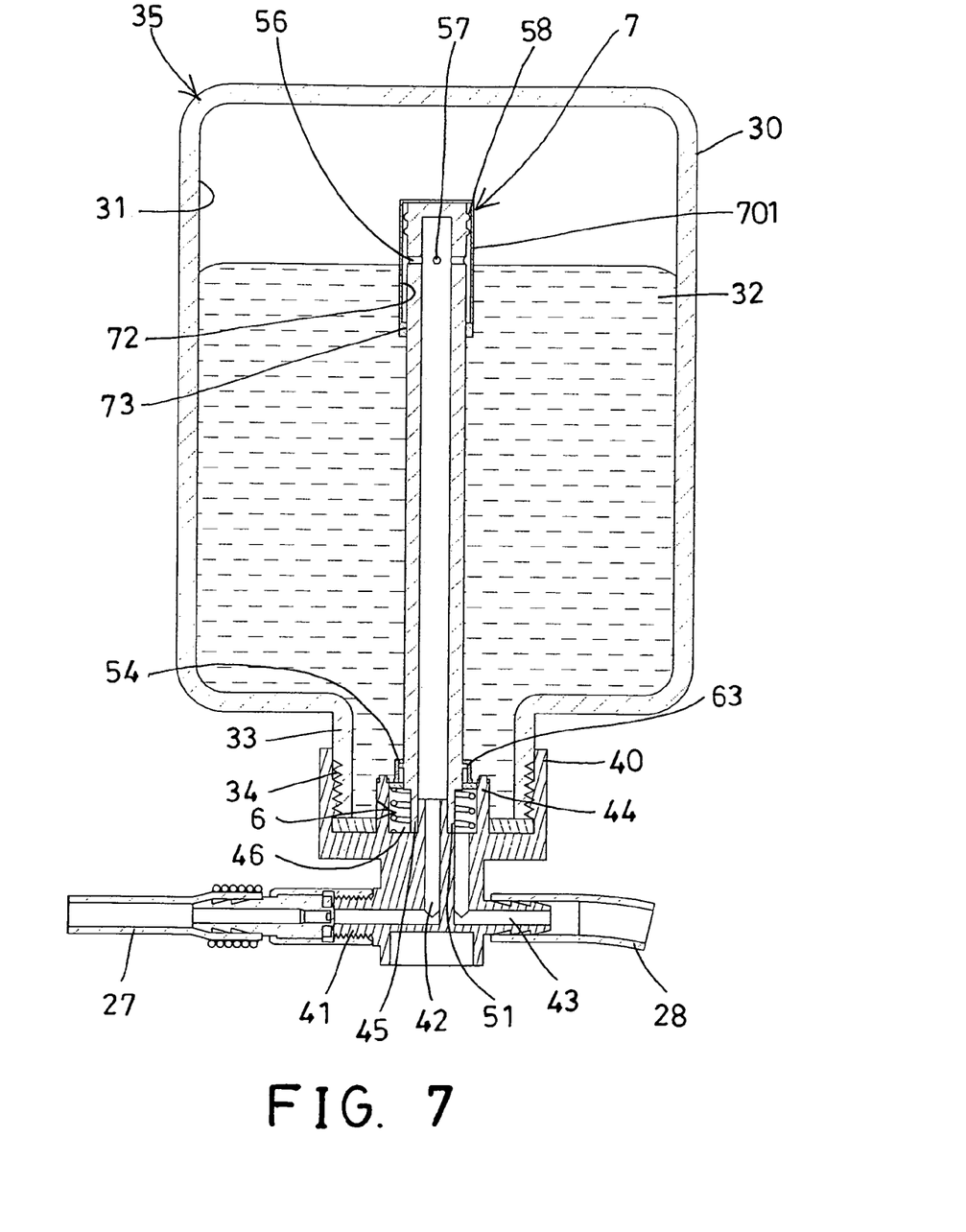
FIG. 7 is another partial cross sectional view similar to FIGS. 5 and 6, illustrating the other arrangement of the sealing and inflating assembly.
Figure 8:
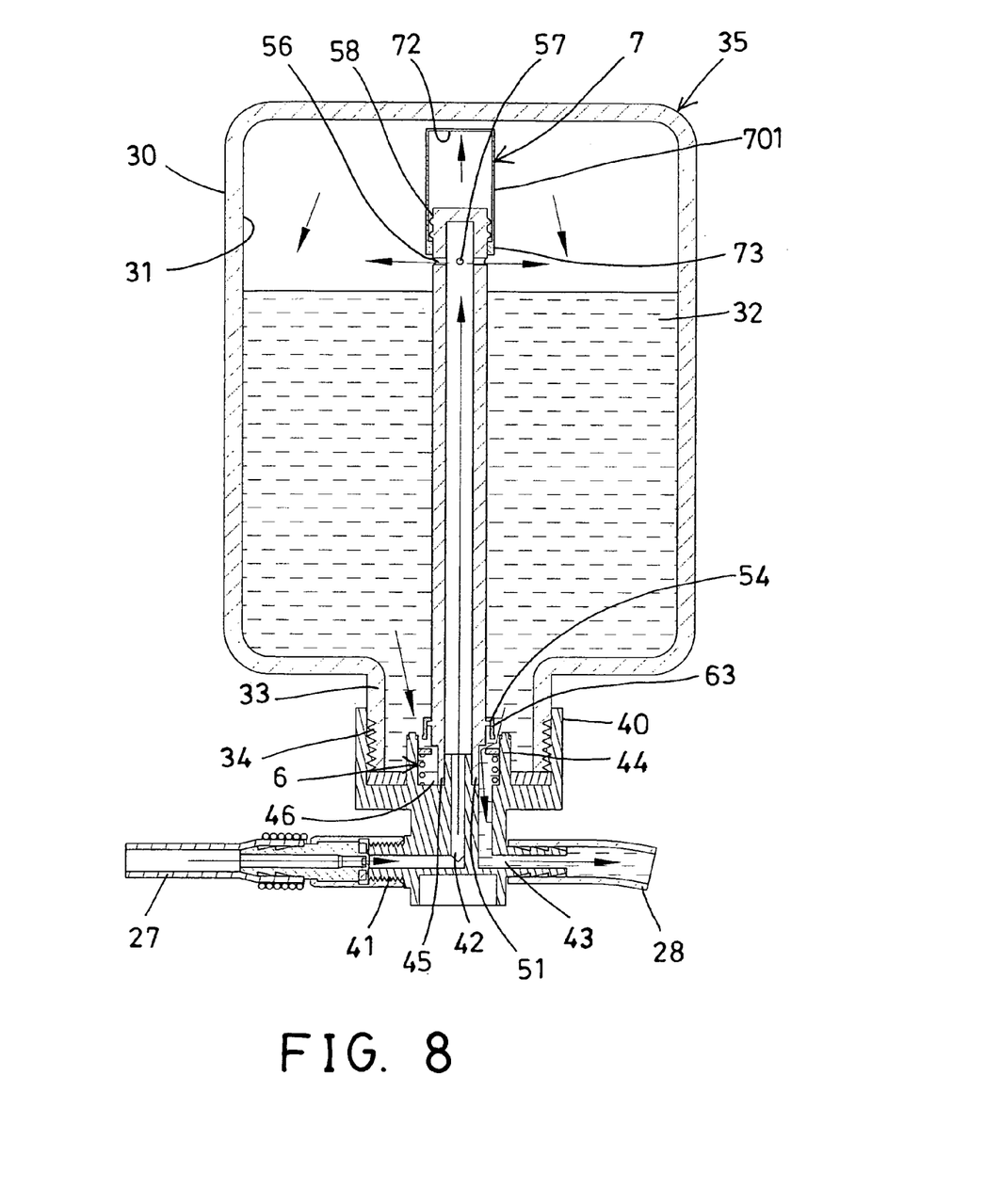
FIG. 8 is a further partial cross sectional view similar to FIG. 7, illustrating the operation of the sealing and inflating assembly as shown in FIG. 7.

Alternatively, as shown in FIGS. 7 and 8, the sleeve 701 of the check valve device 7 may selectively include an enclosed structure having a blind space 72 formed therein for slidably receiving the upper portion or other or second end 55 of the pipe 50 and for selectively blocking or enclosing the air perforations 57 of the pipe 50, and the sleeve 701 includes a sealing and sliding member 73 for slidably engaging with the pipe 50 and for selectively opening the air perforations 57 of the pipe 50 after the sealing and sliding member 73 of the sleeve 701 is moved over the peripheral recess 56 of the pipe 50 (FIG. 8), and thus for allowing the pressurized air to selectively flow through the air perforations 57 of the pipe 50, and then to selectively flow into the lower or the upper or the base portion 35 of the tire repairing container 30.

It is to be noted that the sleeve 70, 701 may act or may be formed as a check valve device 7 for controlling the pressurized air to flow into the base portion 35 of the tire repairing container 30 only, and for preventing the sealing preparation 32 from flowing into the pipe 50, and the stop member 60 may also act or may also be formed as a check valve device 6 for controlling the sealing preparation 32 to selectively flow out through the outlet conduit 43 of the outlet piece 40, such that the tire repairing container 30 may be positioned in any status, such as disposed laterally, or upside down, and the pressurized air may be controlled to flow into the base portion 35 of the tire repairing container 30 only, and the sealing preparation 32 may be controlled to flow out through the outlet conduit 43 of the outlet piece 40 only.

Accordingly, the sealing and inflating assembly includes an air compressing device including an improved tire repairing container for quickly coupling and attaching and securing to an outlet tube of the air compressor and for quickly disengaging from the air compressor and for allowing the tire sealing preparation to be effectively supplied to seal and inflate the inflatable objects, and for easily and quickly and changeably attaching and securing to the outlet tube of the air compressor.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A sealing and inflating assembly comprising:
   an air compressor including a cylinder housing and a motor coupled to said cylinder housing for generating a pressurized air,
   said cylinder housing including an outlet tube extended outwardly therefrom and communicating with said cylinder housing for receiving the pressurized air from said cylinder housing, and including an outlet port provided on said outlet tube,
   a tire repairing container including a compartment formed therein for receiving a sealing preparation, and including a mouth opening formed therein,
   an outlet piece attached and secured to said mouth opening of said tire repairing container, and including an entrance for coupling to said outlet port of said outlet tube, and including an inlet conduit formed therein and communicative with said entrance thereof for guiding the pressurized air to flow through said outlet piece and then into said compartment of said tire repairing container, and including an outlet conduit formed therein and communicative with said compartment of said tire repairing container and offset from said entrance of said outlet piece for allowing the sealing preparation in said compartment of said tire repairing container to selectively flow out through said outlet conduit of said outlet piece,
   a pipe disposed in said compartment of said tire repairing container, and including a first end coupled to said inlet conduit of said outlet piece, and including a bore formed therein and communicative with said inlet conduit of said outlet piece for directing and guiding the pressurized air to flow through said bore of said pipe and to flow into said compartment of said tire repairing container, and including a second end having an air perforation formed therein and communicative with said bore of said pipe, and
   a first check valve device attached onto said second end of said pipe for controlling the pressurized air to selectively flow into said compartment of said tire repairing container, and for preventing the sealing preparation from flowing into said bore of said pipe.

2. The sealing and inflating assembly as claimed in claim 1, wherein said first check valve device includes a resilient sleeve attached onto said second end of said pipe for selectively blocking said air perforation of said pipe.

3. The sealing and inflating assembly as claimed in claim 2, wherein said pipe includes a peripheral recess formed in said second end of said pipe and communicative with said air perforation of said pipe.

4. The sealing and inflating assembly as claimed in claim 2, wherein said pipe includes at least one peripheral bulge extended radially and outwardly therefrom for engaging with said sleeve.

5. The sealing and inflating assembly as claimed in claim 2, wherein said pipe includes a peripheral groove formed in said second end of said pipe, and said sleeve includes a peripheral swelling extended radially and inwardly for selectively engaging with said peripheral groove of said pipe and for anchoring and retaining said sleeve to said second end of said pipe.

6. The sealing and inflating assembly as claimed in claim 1, wherein said outlet piece includes a second check valve device disposed between said pipe and said outlet conduit of said outlet piece for controlling the sealing preparation to selectively flow out through said outlet conduit of said outlet piece.

7. The sealing and inflating assembly as claimed in claim 6, wherein said outlet piece includes a peripheral fence extended therefrom for forming a peripheral chamber between said peripheral fence and said pipe, and said second check valve device includes a stop member slidably received and engaged in said peripheral chamber of said outlet piece for selectively blocking and enclosing said peripheral chamber of said outlet piece and for preventing the sealing preparation from flowing out through said outlet conduit of said outlet piece.

8. The sealing and inflating assembly as claimed in claim 7, wherein said second check valve device includes a spring-biasing member received and engaged in said peripheral chamber of said outlet piece and engaged with said stop member for biasing said stop member to selectively block and enclose said peripheral chamber of said outlet piece.

9. The sealing and inflating assembly as claimed in claim 7, wherein said pipe includes a peripheral shoulder formed therein for selectively engaging with said stop member.

10. The sealing and inflating assembly as claimed in claim 7, wherein said outlet piece includes a cover attached to said peripheral fence for selectively blocking and enclosing said peripheral chamber of said outlet piece.

11. The sealing and inflating assembly as claimed in claim 10, wherein said outlet piece includes at least one peg extended from said peripheral fence, and said cover includes at least one orifice formed therein for engaging with said at least one peg of said peripheral fence and for anchoring and positioning said cover to said peripheral fence of said outlet piece.

12. The sealing and inflating assembly as claimed in claim 10, wherein said cover includes a plurality of apertures formed therein for communicating said compartment of said tire repairing container with said peripheral chamber of said outlet piece.

* * * * *